Patented Oct. 21, 1924.

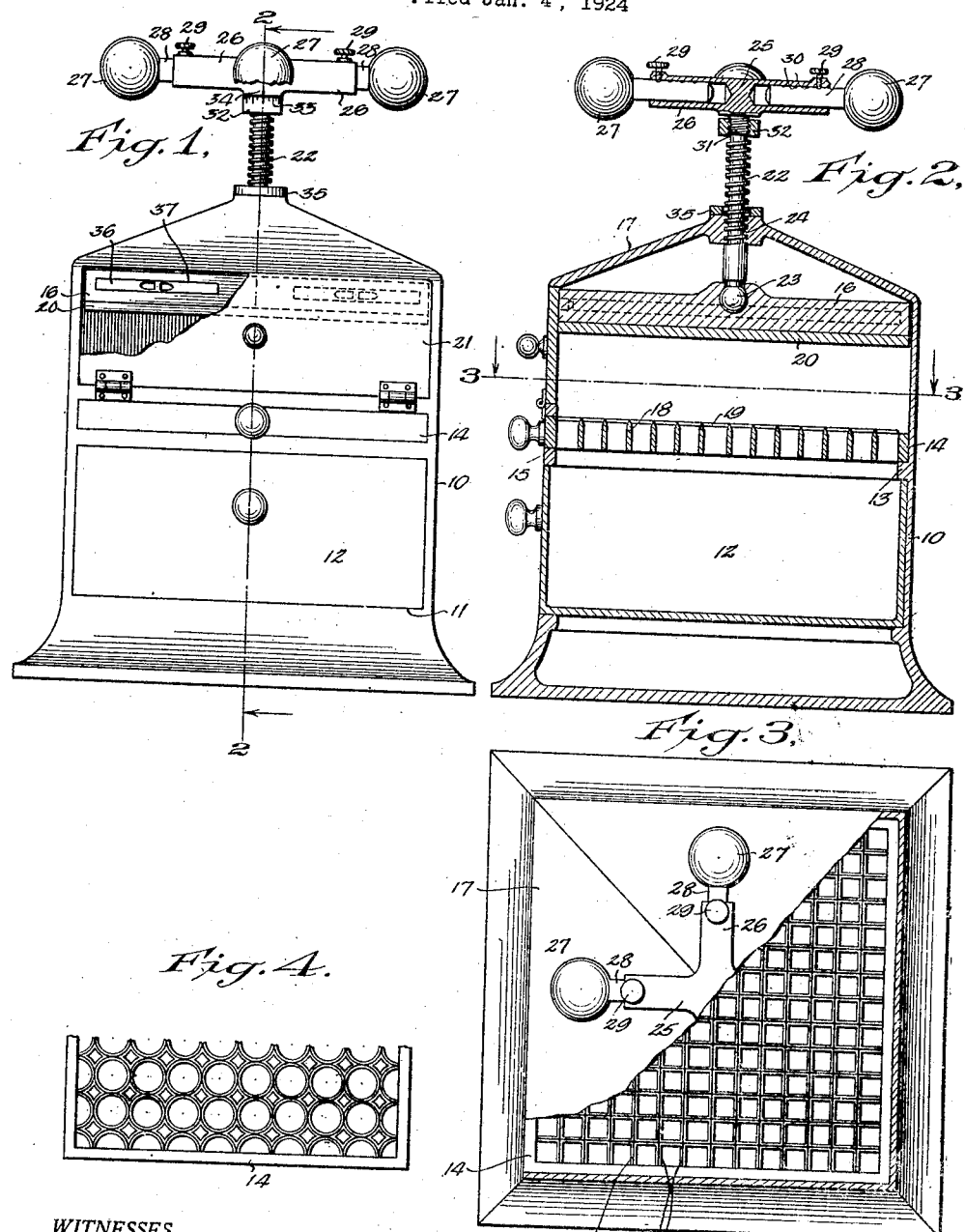

1,512,644

UNITED STATES PATENT OFFICE.

SEYMOUR W. SMITH, OF HARTFORD, CONNECTICUT.

FOOD-PREPARING MACHINE.

Application filed January 4, 1924. Serial No. 684,421.

*To all whom it may concern:*

Be it known that I, SEYMOUR W. SMITH, a citizen of the United States, and a resident of Hartford, in the county of Hartford and State of Connecticut, have invented a new and Improved Food-Preparing Machine, of which the following is a full, clear, and exact description.

This invention has relation to machines for the preparation of food stuffs and has particular reference to a machine for cutting, slicing or checking vegetables, fruits or the like, or for cutting doughnuts, biscuits, or other analogous uses.

Primarily the invention contemplates a machine of the character set forth which is especially adapted for use in large hotels, restaurants, or other eating places, by means of which time and labor will be saved in the preparation of food stuffs for cooking.

As a further object the invention aims to provide a machine in which a maximum of pressure for effecting the cutting, slicing or checking of the food stuffs may be obtained from a minimum of physical effort.

Further objects of the invention reside in a machine which prevents the loss of juices from the fruits, vegetables or other food stuffs being cut, which completely encloses the articles being acted upon in order to protect the eyes of the operator; which is adjustable to regulate the depth of the cut and the pressure exerted on the articles; and which is sanitary and readily cleansed.

As a still further object the invention comprehends a machine of the character set forth which is comparatively simple in its construction and mode of use, which is thoroughly reliable and highly efficient in its purpose, and which is inexpensive to manufacture.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a front view of a machine constructed in accordance with the invention, the same being partly broken away to disclose the underlying structure.

Fig. 2 is a vertical sectional view therethrough taken approximately on the line indicated at 2—2 in Fig. 1.

Fig. 3 is a sectional plan view taken approximately on the line 3—3 of Fig. 2.

Fig. 4 is a fragmentary plan view of a modified form of cutting element which may be used in connection with the machine.

Referring to the drawings by characters of reference, 10 designates a housing or casing which is provided with an opening 11 in the lower portion of its front wall for receiving therethrough a drawer 12. Immediately above the drawer 12 an internal bead 13 is formed in the casing for supporting a cutter element 14 which is introduced through an opening 15 in the front wall. A pressure element or follower 16 is vertically movable in the upper portion of the casing between the upper wall 17 and the cutter element 14. The cutter element 14 includes a plurality of blades 18 having the cutting edges 19 disposed upwardly in confronting relation to the bottom or under side of the pressure element or follower member 16, which underside is preferably covered with a yieldable material 20 constituting a buffer means. The front wall of the upper portion of the casing is provided with a hinged door 21 which when open allows for the introduction of the fruits, vegetables or other food stuffs to be acted upon and which when closed serves to completely house the said articles. The means for effecting movements of the pressure element or follower member 16 consists of a threaded shaft 22 which is swiveled at its lower end as at 23 to the upper portion of the follower member or pressure element 16 and extends through and threadedly engages the vertically threaded bore 24 at the central portion of the upper wall 17 of the casing. At its upper end the shaft is provided with a head 25 having radially projecting tubular spokes 26. Weighted handle members 27 provided with shanks 28 are employed which are radially adjustable for increasing and decreasing the centrifugal force or action of the same upon spinning of the head 25. In order to connect the said weighted handle members with the head the shanks 28 thereof are telescopically associated with the tubular spokes 26 and are retained in their radially adjusted positions by the engagement of set screws 29 extending through the tubular spokes, with a longitudinal series of notches 30 in the shanks 28. In order to regulate the downward movement at the stroke of the follower member, the shaft 22 at its juncture with the head 25 is provided with a separately threaded portion 31 upon which a longitudinally adjustable abutment nut 32 is mounted. The exterior face of the abutment nut is formed with a graduated scale 33 which is designed to coact with a marking 34 on the head whereby a substantially micrometer adjustment may be made for varying the stroke in accordance with the work to be done. A yieldable buffer 35 surrounds the shaft 22 and is located adjacent the upper end of the bore 24 for coacting engagement with the nut 32. In addition to the weighted handle members 27 the pressure may be further varied by inserting or removing the weights 36 in the receiving openings 37 formed in the body of the pressure element or follower member 16, said removal or insertion being accomplished through the opening when the door 21 is opened.

The blades of the cutting elements may be varied in shape for performing different functions, that of the preferred form illustrated being designed for slicing, checking or cutting the fruits, vegetables or other food stuffs into squares. In the modified form of cutter element illustrated in Fig. 4 the blades are designed for cutting the articles into circular formation whereby dough for biscuits may be readily shaped.

In use and operation of the machine, if for instance it is desired to cut, slice or check onions, potatoes or the like, the follower 16 is raised to its uppermost limit, as illustrated in Figs. 1 and 2, the door 21 is opened and the articles are arranged on the blades of the cutter element 14. The door 21 is then closed and by means of the weighted handles 27 the head 25 is spun to rotate the shaft 22 therewith. The centrifugal force of the weighted handle members 27 together with the weight of the follower 16 will effect a rapid downward movement of said follower to rapidly force the articles through the spaces between the blades thereby slicing, cutting or checking the same, the slices or checks being received in the drawer 12 together with the juices which result from the cutting or slicing operation. Where the fruits, vegetables, or other food stuffs to be sliced, cut or checked require only a light pressure the weighted handle members 27 are adjusted radially inward and the weights 36 are removed. Where a heavier pressure is desired the weighted handle members 27 are adjusted radially outward and the weights 36 are inserted in their receiving openings 37 in the follower or pressure member 16. Where it is desired to score meat or other food stuffs, the adjustable abutment nut 32 is moved downwardly away from the head 25 whereby said nut engaging with the buffer member 35 will act to prevent engagement of the lower surface of the follower or pressure element 16 with the cutting edges of the knives, thereby regulating to a nicety the depth of the cut to produce scores in the side of the article which rests upon the cutting edges 19. The cleansing of the machine may be readily accomplished by removing the drawer 12 and the cutter element 14 after which the face of the follower or pressure member 16 and the inner walls of the casing 10 may be cleansed, while the drawer and cutter element are separately cleansed.

From the foregoing it will thus be seen that a comparatively inexpensive yet highly efficient machine has been devised which may be employed for simultaneously cutting, checking or scoring food stuffs in large quantities at a single operation. It will be further noted that the construction of the means for exerting the pressure necessary to the operation of the device allows for a maximum pressure exerted with a minimum of physical effort due to the counterbalance follower and a combined centrifugal force of the rotary head 25 and the weight of the follower or pressure element 16. The interchangeability of a plurality of cutter elements 14 allows for the employment of the machine for various uses.

I claim:

1. In a machine for cutting, slicing or scoring articles of food, a casing, a cutter member transversely arranged therein, a centrifugally operated pressure member mounted for longitudinal movement in the casing for forcibly engaging the articles with the cutter member, said pressure member including adjustable means for regulating the centrifugal force whereby to vary the impact of the same, and means for regulating the stroke of the pressure member whereby to vary the depth of the cut of the cutter member in the articles to be cut.

2. In a machine for cutting, slicing or scoring articles of food, a casing, a cutter member disposed transversely therein, a pressure member mounted for longitudinal movements in the casing to forcibly engage the articles with the cutter member, and a centrifugally operated means connected with the pressure member for effecting the movement of the same.

3. In a machine for cutting, slicing or scoring articles of food, a casing, a cutter member disposed transversely therein, a pressure member mounted for longitudinal movements in the casing to forcibly engage the articles with the cutter member, a centrifugally operated means connected with the pressure member for effecting the movement of the same, and means for regulating the centrifugal means to vary the pressure exerted thereby.

4. In a machine for cutting, slicing or scoring articles of food, a casing, a cutter member disposed transversely therein, a pressure member mounted for longitudinal movements in the casing to forcibly engage the articles with the cutter member, a centrifugally operated means connected with the pressure member for effecting the movement of the same, means for regulating the centrifugal means to vary the pressure exerted thereby, and means for regulating the stroke of the pressure member to vary the depth of the cut, slice or score to be made.

5. In a machine for cutting, slicing or scoring articles of food, a casing, a cutter member disposed transversely therein, a pressure member mounted for longitudinal movements in the casing to forcibly engage the articles with the cutter member, a shaft extending longitudinally through the upper end of said casing and threadedly engaging the same, a swiveled connection between the lower end of said shaft and pressure member, and a head at the upper end of said shaft having radially adjustable weighted handles for exerting a controlled centrifugal force on the shaft to move the same together with the pressure member.

6. In a machine for cutting, slicing or scoring articles of food, a casing, a cutter member disposed transversely therein, a pressure member mounted for longitudinal movements in the casing to forcibly engage the articles with the cutter member, a shaft extending longitudinally through the upper end of said casing and threadedly engaging the same, a swiveled connection between the lower end of said shaft and pressure member, a head at the upper end of said shaft having radially adjustable weighted handles for exerting a controlled centrifugal force on the shaft to move the same together with the pressure member, and a stop element longitudinally adjustable on the upper end of the shaft for engaging the casing to regulate the depth of the cut or score to be made.

SEYMOUR W. SMITH.